(12) United States Patent
Park

(10) Patent No.: US 10,351,102 B2
(45) Date of Patent: Jul. 16, 2019

(54) APPARATUS FOR SENSING REMAINING PASSENGER IN VEHICLE AND GENERATING ALARM

(71) Applicant: Dnet Co., Ltd., Daegu (KR)

(72) Inventor: Seong Jeong Park, Daegu (KR)

(73) Assignee: DNET CO., LTD., Daegu (KR)

( * ) Notice: Subject to any disclaimer, the term of this patent is extended or adjusted under 35 U.S.C. 154(b) by 0 days.

(21) Appl. No.: 16/040,349

(22) Filed: Jul. 19, 2018

(65) Prior Publication Data
US 2019/0143944 A1 May 16, 2019

(30) Foreign Application Priority Data
Nov. 15, 2017 (KR) .................. 10-2017-0151957

(51) Int. Cl.
| | |
|---|---|
| *B60R 25/10* | (2013.01) |
| *B60R 25/31* | (2013.01) |
| *B60R 25/01* | (2013.01) |
| *G06K 9/00* | (2006.01) |
| *B60R 25/20* | (2013.01) |
| *B60R 25/34* | (2013.01) |

(52) U.S. Cl.
CPC ............. *B60R 25/31* (2013.01); *B60R 25/01* (2013.01); *B60R 25/1001* (2013.01); *B60R 25/2036* (2013.01); *B60R 25/34* (2013.01); *G06K 9/00838* (2013.01)

(58) Field of Classification Search
CPC ........ B60R 25/31; B60R 25/01; B60R 25/10; B60N 2/002; G08B 21/02
See application file for complete search history.

(56) References Cited

U.S. PATENT DOCUMENTS

| | | | | |
|---|---|---|---|---|
| 8,232,874 | B1* | 7/2012 | Aneiros ............ | B60H 1/00657 340/438 |
| 2006/0273917 | A1* | 12/2006 | Rams, Jr. ............... | B60N 2/002 340/667 |
| 2006/0290518 | A1* | 12/2006 | Bingle .................... | E05B 83/26 340/573.1 |
| 2008/0292146 | A1* | 11/2008 | Breed .................... | B60N 2/002 382/118 |
| 2015/0226146 | A1* | 8/2015 | Elwart ................... | B60K 28/04 701/49 |
| 2017/0174122 | A1* | 6/2017 | Cheng .................... | B60Q 1/323 |
| 2018/0025604 | A1* | 1/2018 | Protopsaltis ........ | G08B 21/0205 340/457 |

FOREIGN PATENT DOCUMENTS

KR         10-0569849 B1     4/2006

* cited by examiner

*Primary Examiner* — Phung Nguyen
(74) *Attorney, Agent, or Firm* — Rabin & Berdo, P.C.

(57) ABSTRACT

Provided is an apparatus for sensing a remaining passenger in a vehicle and generating an alarm. The apparatus includes a first sensor unit provided on the ceiling of the inside of the vehicle and configured to sense presence or absence of a remaining passenger per seat when a door of a driver's seat is open in an engine off or on state, and a controller configured to generate an alarm when there is a remaining passenger in a seat other than the driver's seat when the engine is turned off and to determine whether the door of the driver's seat is closed and generate an alarm when the first sensor unit senses exit of a driver and presence of a remaining passenger.

7 Claims, 4 Drawing Sheets

APPARATUS FOR SENSING REMAINING PASSENGER IN VEHICLE AND GENERATING ALARM

BACKGROUND OF THE INVENTION

Field of the Invention

The present invention relates to an apparatus for sensing a remaining passenger in a vehicle and generating an alarm, which is able to sense a remaining passenger in a vehicle using radar sensors and generate an alarm.

More specifically, the present invention relates to an apparatus for sensing a remaining passenger in a vehicle and generating an alarm, which includes a first sensor unit provided on the ceiling of the inside of the vehicle and configured to sense presence or absence of a remaining passenger per seat when a door of a driver's seat is open in an engine off or on state, and a controller configured to generate an alarm when there is a remaining passenger in a seat other than the driver's seat when the engine is off and to determine whether the door of the driver's seat is closed and generate an alarm when the first sensor unit senses exit of a driver and presence of a remaining passenger.

Description of the Related Art

Kindergartens or nursery schools operating at the local level use small buses as transportation means for carrying children. A driver, a large number of children, and one guidance teacher who assists children in boarding/exiting a vehicle ride in the bus, in general.

Such a kindergarten vehicle stops at residences of a large number of children to allow the children to board the vehicle and moves to a kindergarten and starts from the kindergarten and travels to residences of children to send them home.

However, when one guidance teacher manages children exiting the vehicle, children remaining in a vehicle may not be taken care of.

When a child falls asleep or is at an unnoticed position in the vehicle, the driver and the guidance teacher may finish the service and lock the vehicle doors upon misjudging that all children have exited the vehicle.

Accordingly, a child remaining in the closed vehicle may face danger of an accident such as suffocation according to weather conditions or as time passes.

As a conventional technology for preventing such accidents with respect to vehicles, Korean Patent No. 10-0569849 discloses a system in which a sensor for sensing a remaining passenger in a vehicle for children is configured using a heat sensor and attached per row of seats, and a warning system operates when the heat sensor senses a remaining person when the vehicle stops such that a driver does not exit the vehicle when there is a person remaining in the vehicle.

However, in the conventional technology using a heat sensor, the heat sensor may malfunction due to the influence of in-vehicle temperature or misrecognize a remaining passenger in a vehicle. Accordingly, a driver may exit the vehicle and thus it is difficult to cope with dangerous situations.

Furthermore, unnecessary alarm may be generated even when a driver who recognizes a remaining passenger in the vehicle is located around the vehicle. Accordingly, it is necessary to alarm about movement of the driver when the vehicle stops or the driver exits the vehicle.

CITATION LIST

Patent Literature (Patent Literature 1) Korean Patent No. 10-0569849 (Apr. 11, 2006)

SUMMARY OF THE INVENTION

Therefore, the present invention has been made in view of the above problems, and it is an object of the present invention to provide an apparatus for sensing a remaining passenger in a vehicle and generating an alarm which is able to sense a remaining passenger using radar sensors and generate an alarm.

In accordance with the present invention, the above and other objects can be accomplished by the provision of an apparatus for sensing a remaining passenger in a vehicle and generating an alarm, including: a first sensor unit provided on the ceiling of the inside of the vehicle and configured to sense presence or absence of a remaining passenger per seat when a door of a driver's seat is open in an engine off or on state; and a controller configured to generate an alarm when there is a remaining passenger in a seat other than the driver's seat when the engine is turned off and to determine whether the door of the driver's seat is closed and generate an alarm when the first sensor unit senses exit of a driver and presence of a remaining passenger.

The apparatus may further include a second sensor unit provided at an external doorknob of a door of the vehicle and configured to sense an object within a predetermined range, wherein the controller may operate the second sensor unit when the door of the driver's seat switches to a closed state after the first sensor unit operates according to opening of the door of the driver's seat in an engine on state to sense exist of the driver and presence of a remaining passenger and generate an alarm when an object sensed by the second sensor unit is out of the predetermined range.

Each of the first sensor unit and the second sensor unit may be composed of at least one radar sensor, and the controller may determine whether an object is present using transmission and reception time for which a signal transmitted by the first sensor unit or the second sensor unit to a predetermined area is reflected and received and determine whether the object is a person by comparing the signal with predetermined heartbeat patterns through waveform analysis.

The controller may determine whether the door of the driver's seat is closed through a lighting on/off control signal generated when a vehicle door is open or closed.

When the first sensor unit operates for a predetermined time to sense no remaining passenger, the driver exits the vehicle and vehicle doors switch to a closed state when the engine is turned off, the controller may set a theft sensing mode to control vehicle windows to be locked and then operate the first sensor unit in a predetermined period.

The controller may generate an alarm when an object in the vehicle is sensed in the theft sensing mode and terminate the theft sensing mode when the vehicle doors are unlocked or the theft sensing mode is cancelled.

The controller may be connected to a vehicle engine off terminal and a window lock terminal and, when engine off is detected through the vehicle engine off terminal, may supply vehicle delay power or additional power to the window lock terminal to control the vehicle windows to be locked.

The second sensor unit may include radar sensors respectively provided at external doorknobs of the vehicle doors, and the controller may primarily operate the radar sensor provided at the external doorknob of the door of the driver's seat upon determining that the door of the driver's seat is closed and sequentially operate radar sensors to which an object moves according to movement of the object.

The controller may extract a heart rate from the waveform of a signal reflected from a remaining passenger when the door of the driver's seat is open after the driver exits the vehicle and the remaining passenger is sensed, and generate an alarm when the extracted heart rate is equal to or higher than a predetermined heart rate and a time for which the driver leaves the vehicle exceeds a reference time.

The controller may periodically extract waveforms of reflected signals received by the first sensor unit and generate an alarm when an abnormal pattern according to abrupt change is sensed.

As described above, according to the present invention, the apparatus for sensing a remaining passenger in a vehicle and generating an alarm of the present invention is able to sense a remaining passenger per row of seats when the door of the driver's seat is open in an engine off or on state.

If there is a person remaining in the vehicle when the engine is turned off and the driver does not exit the vehicle, an alarm can be generated to enable the driver to recognize the remaining person.

If there is a person remaining in the vehicle when the driver exits the vehicle and the door of the driver's seat is closed in an engine on state, it is possible to reduce the number of unnecessary alarms by detecting movement of the driver and generating an alarm when the driver leaves a predetermined range.

In addition, it is possible to discriminate a remaining person from objects in the vehicle by sensing the heartbeat of the person using a radar sensor to achieve accurate recognition of the remaining person. Furthermore, movement of the driver is sensed using an external sensor and thus an alarm can be generated only as necessary.

Moreover, when no remaining passenger is sensed after the engine is turned off, sensors can be used for a theft detection mode and can automatically switch to a remaining passenger sensing mode according to unlocking of vehicle doors.

In addition, when the driver exits the vehicle in a vehicle door open state, a time for which the driver leaves the vehicle is checked and an alarm can be generated when a person remaining in the vehicle is recognized as a child through heart rate sensing. Further, when an abnormal pattern with respect to the remaining passenger is detected, it is possible to warn about a dangerous situation by immediately generating an alarm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
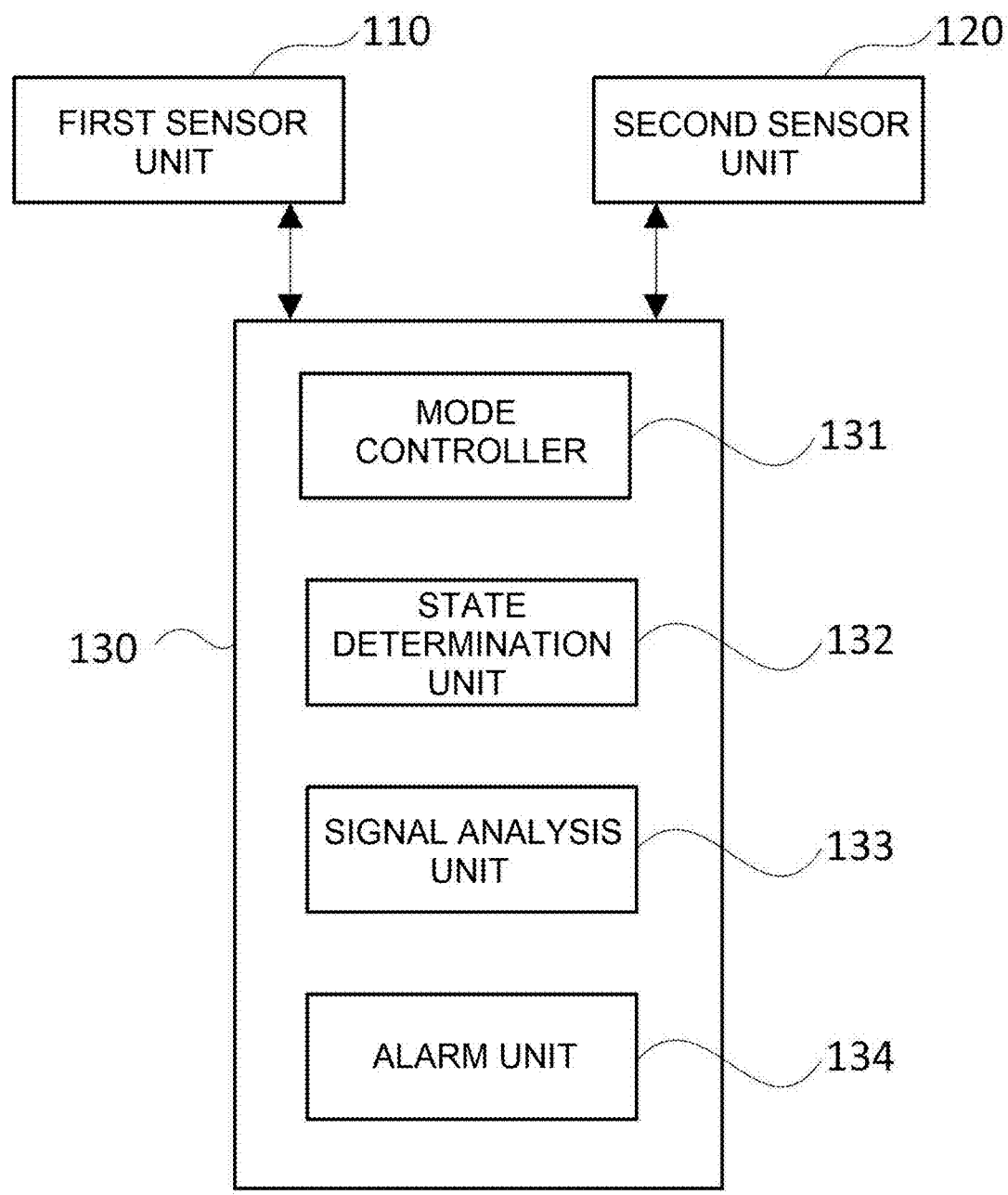
FIG. 1 is a block diagram showing a schematic configuration of an apparatus for sensing a remaining passenger in a vehicle and generating an alarm according to an embodiment of the present invention.

It should be understood that the terms used in the specification and appended claims should not be construed as limited to general and dictionary meanings but be construed based on the meanings and concepts according to the spirit of the present invention on the basis of the principle that the inventor is permitted define appropriate terms for best explanation.

Therefore, the preferred embodiments described in the specification and shown in the drawings are illustrative only and are not intended to represent all aspects of the invention, such that various equivalents and modifications can be made without departing from the spirit of the invention.

Prior to description with reference to the drawings, it should be understood that particulars which are not necessary to describe essential characteristics of the present invention, that is, known configurations that can be obviously added by skilled in the art are not illustrated or not described in detail.

FIG. 1 is a block diagram showing a schematic configuration of an apparatus for sensing a remaining passenger in a vehicle and generating an alarm according to an embodiment of the present invention. Referring to FIG. 1, the apparatus 100 for sensing a remaining passenger in a vehicle and generating an alarm according to an embodiment of the present invention may include a first sensor unit 110, a second sensor unit 120 and a controller 130. The controller 130 may include a mode controller 131, a state determination unit 132, a signal analysis unit 133 and an alarm unit 134.

Figure 2:
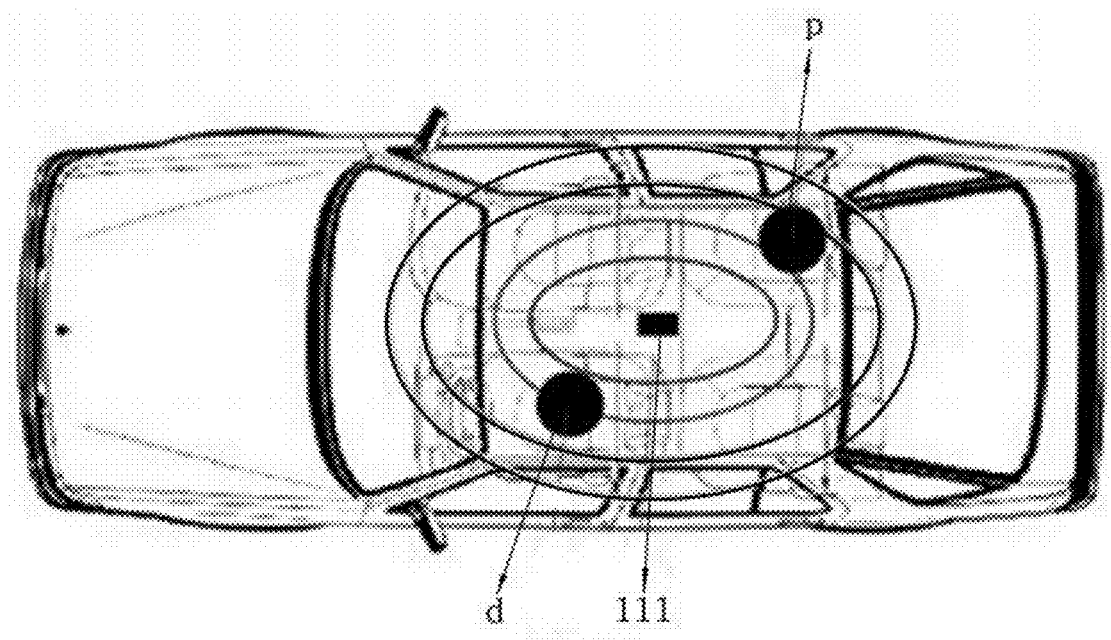
FIGS. 2 and 3 show examples of application of a first sensor unit and a second sensor unit according to an embodiment of the present invention.
Figure 3:
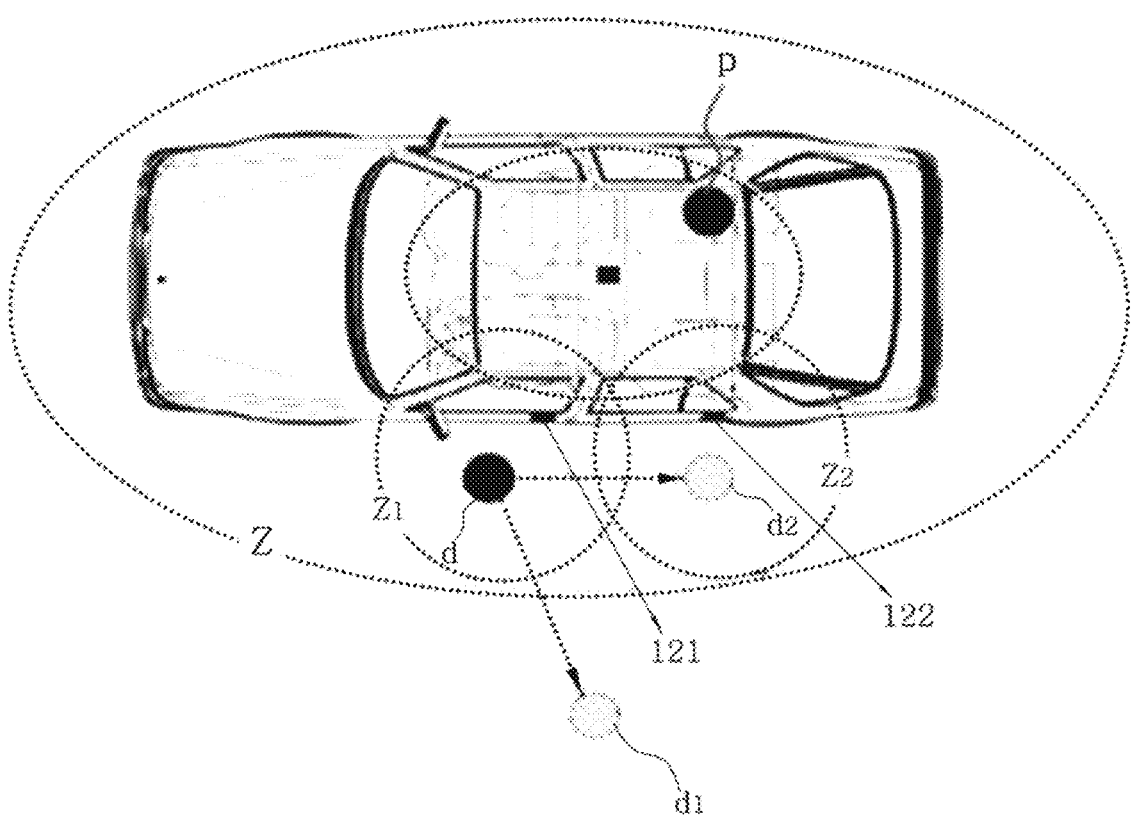

Here, the first sensor unit 110 and the second sensor unit 120 may be composed of one or more radar sensors 111, 121 and 122, as shown in FIGS. 2 and 3. The first sensor unit 110 is provided on the ceiling of the inside of the vehicle and may sense presence or absence of a remaining passenger per seat when a door of a driver's seat is open in an engine off or on state. In the case of FIG. 2, a driver d at a driver's seat and a remaining passenger P may be sensed using the radar sensor 111.

Here, the radar sensor of the first sensor unit 110 is provided per seat and may transmit signals having different wavelengths to the driver's seat and other seats and receive reflected signals to sense presence or absence of a remaining passenger per seat.

The second sensor unit 120 may be provided at external doorknobs of the vehicle doors to sense an object within a predetermined range. Referring to FIG. 3, the second sensor unit 120 may sense movement of an object (driver d) by primarily operating the radar sensor 121 provided at the external doorknob of the door of the driver's seat to sense the object and sequentially operating radar sensors 122 according to movement (d→d2) of the object sensed by the radar sensor 121. When the driver leaves a predetermined range Z (d→d1) in a door closed state, an alarm may be generated.

The mode controller 131 of the controller 130 may set a remaining passenger sensing mode when the door of the driver's seat is open in an engine off or on state and automatically switch the remaining passenger sensing mode to a theft sensing mode when no remaining passenger is sensed in the remaining passenger sensing mode after the engine is turned off.

Here, the mode controller 131 may control the first sensor unit 110, the second sensor unit 120 and the alarm unit 140 according to a vehicle state determined by the state determination unit 132, presence or absence of a remaining passenger determined by the signal analysis unit 133, and vehicle entry/exit of the driver.

The state determination unit 132 may determine a vehicle state such as engine on/off of the vehicle, opening/closing of the door of the driver's seat, vehicle door lock/unlock, window opening/closing, and the like.

The signal analysis unit 133 may analyze signals transmitted or received by the first sensor unit 110 and the second sensor unit 120 operating according to a vehicle state determined by the state determination unit 132 to determine vehicle entry/exit and movement of the driver, presence or absence of a remaining passenger, a heartbeat pattern and a heart rate of a remaining passenger, etc.

The alarm unit 134 may generate an alarm through alarm sound, emergency light blinking and the like when the mode controller 133 determines a dangerous situation using determination of the state determination unit 132 and the signal analysis unit 133.

A method of sensing a remaining passenger and generating an alarm performed in the controller 130 will be described in detail with reference to the flowchart of FIG. 4.

Figure 4:
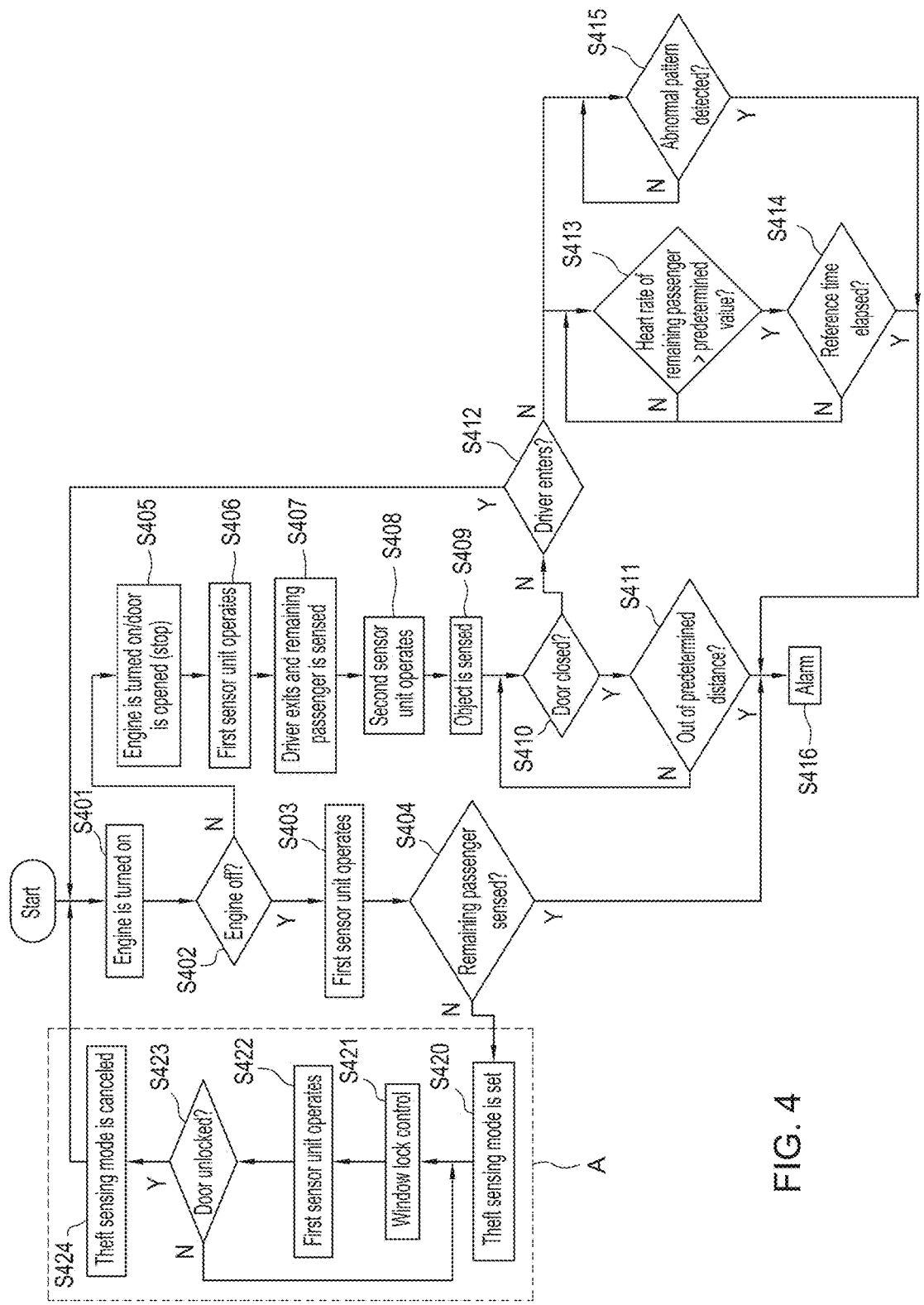
FIG. 4 is a flowchart illustrating a method for sensing a remaining passenger in a vehicle and generating an alarm according to an embodiment of the present invention.

FIG. 4 is a flowchart illustrating a method for sensing a remaining passenger in a vehicle and generating an alarm according to an embodiment of the present invention. Here, A may correspond to steps in which operations in the theft sensing mode are performed and other steps may correspond to operations in the remaining passenger sensing mode.

Referring to FIG. 4, when an engine on state (S401) of the vehicle switches to an engine off state (S402) or door opening according to vehicle stop is sensed in the engine on state in S401 (S405), the remaining passenger sensing mode is executed and thus the first sensor unit 110 may operate (S403 and S406).

The first sensor unit 110 may operate for a predetermined time immediately after the engine is turned off, and an alarm may be generated before the driver exits the vehicle when a remaining passenger is sensed (S415).

Here, the signal analysis unit 133 may determine presence or absence of an object using a transmission/reception time for which a radar signal transmitted by the first sensor unit 110 to a predetermined area is reflected and received, and determine whether the object is a person by comparing the received signal with a predetermined heartbeat pattern through waveform analysis. Accordingly, a remaining person can be determined as a person even if the remaining person does not move because he/she is sleeping.

When the first sensor unit operates according to step S405 (S406), the first sensor unit may sense whether the driver exits the vehicle and whether there is a remaining passenger (S407). Here, when a remaining passenger is sensed, the second sensor unit 120 may operate (S408).

In operation of the second sensor unit 120, the first radar sensor 121 provided at the external doorknob of the door of the driver's seat may operate primarily. Accordingly, the driver may be recognized as an object when the driver exits the vehicle, and the radar sensor 122 in proximity to a position to which the driver moves may subsequently operate according to movement of the driver to recognize the movement of the driver (S409).

Here, when the door of the driver's seat is closed (S410: Y), presence of the remaining passenger in the vehicle may be indicated through an alarm (S416) when the driver leaves a predetermined range (S411).

Here, whether the door of the driver's seat is closed may be determined through a lighting on/off control signal generated when the door is open or closed.

On the other hand, when the second sensor unit 120 senses that the door is open (S410: N), an unnecessary alarm may not be generated upon determining that no dangerous situation occurs. However, when the remaining passenger in the vehicle is a child or a dangerous situation due to abrupt heartbeat pattern variation occurs, an alarm may be generated even when the door is open.

That is, when the driver in the driver's seat is not sensed in a door open state (S410) (S412: N), a heart rate may be extracted from the waveform of a signal obtained when a radar signal is transmitted from the first sensor unit 110 and reflected by the remaining passenger, and an alarm may be generated when the extracted heart rate is equal to or higher than a predetermined heart rate and a time for which the driver leaves the vehicle exceeds a reference time (S414).

Alternatively, the waveforms of signals reflected by a remaining passenger may be periodically extracted and an alarm may be generated (S416) when an abnormal pattern caused by abrupt variation is sensed (S415).

When the first sensor unit 110 operates for a predetermined time to sense no remaining passenger (S404: N) and the vehicle door switches to a closed state after the driver exits the vehicle in the engine off state, the theft sensing mode may be set (S420). Here, to set the theft sensing mode, the state determination unit 122 may be connected to a vehicle engine off terminal and a window lock terminal.

Accordingly, when engine off is sensed through the vehicle engine off terminal, movement of an object according to theft may be sensed by supplying vehicle delay power or additional power to the window lock terminal to control vehicle windows to be locked (S421) and then operating the first sensor unit 110 in a predetermined period (S422). Here, an alarm may be generated when an object in the vehicle is sensed in the theft sensing mode.

In the case of normal door unlock (S423), the theft sensing mode may be automatically canceled (S424). Here, normal door unlock may be door unlock using a vehicle key.

The above description using FIGS. 1 to 4 relates only to essential features of the present invention and various designs can be made within the technical scope of the present invention and thus the present invention is not limited to the configurations of FIGS. 1 to 4.

What is claimed is:

1. An apparatus for sensing a remaining passenger in a vehicle and generating an alarm, comprising:
   a first sensor unit provided on the ceiling of the inside of the vehicle and configured to sense presence or absence of the remaining passenger per seat when a door of a driver's seat is open in an engine off or on state;
   a second sensor unit provided at an external doorknob of the vehicle; and
   a controller,
   wherein the controller generates the alarm when there is the remaining passenger in a seat other than the driver's seat in a state that the engine is turned off,
   wherein each of the first sensor unit and the second sensor unit is composed of at least one radar sensor, and the controller determines whether an object is present using transmission and reception time for which a signal transmitted by the first sensor unit or the second sensor unit to a predetermined area is reflected and received and determines whether the object is a person by comparing the signal with predetermined heartbeat patterns through waveform analysis, wherein the second sensor unit is configured to sense the object within a predetermined range, wherein the controller operates the second sensor unit when the door of the driver's seat switches to a closed state after the first sensor unit, which has operated according to opening of the door of the driver's seat in the engine on state, senses exist of the driver and presence of the remaining passenger and generates the alarm when the object sensed by the second sensor unit is out of the predetermined range, and wherein the controller periodically extracts waveforms of reflected signals received by the first sensor unit and generates the alarm when an abnormal pattern according to abrupt change is sensed.

2. The apparatus according to claim 1, wherein the controller determines whether the door of the driver's seat is closed through a lighting on/off control signal generated when a vehicle door is open or closed.

3. The apparatus according to claim 1, wherein, when the first sensor unit operates for a predetermined time to sense no remaining passenger, the driver exits the vehicle and vehicle doors switch to a closed state when the engine is turned off, the controller sets a theft sensing mode to control vehicle windows to be locked and then operates the first sensor unit in a predetermined period.

4. The apparatus according to claim 3, wherein the controller generates the alarm when the object in the vehicle is sensed in the theft sensing mode and terminates the theft sensing mode when the vehicle doors are unlocked or the theft sensing mode is cancelled.

5. The apparatus according to claim 3, wherein the controller is connected to a vehicle engine off terminal and a window lock terminal and, when engine off is detected through the vehicle engine off terminal, supplies vehicle delay power or additional power to the window lock terminal to control the vehicle windows to be locked.

6. The apparatus according to claim 1, wherein the second sensor unit includes radar sensors respectively provided at external doorknobs of the vehicle doors, and the controller primarily operates the radar sensor provided at the external doorknob of the door of the driver's seat upon determining that the door of the driver's seat is closed and sequentially operates radar sensors to which the object moves according to movement of the object.

7. The apparatus according to claim 1, wherein the controller extracts a heart rate from the waveform of a signal reflected from the remaining passenger when the door of the driver's seat is open after the driver exits the vehicle and the remaining passenger is sensed, and generates the alarm when the extracted heart rate is equal to or higher than a predetermined heart rate and a time for which the driver leaves the vehicle exceeds a reference time.

* * * * *